३,२९७,४१३
Patented Jan. 10, 1967

3,297,413
METHOD OF PREPARING MgSO$_4$·3H$_2$O CRYSTALS
Wallis R. Bennett, Midland, Mich., assignor to The Dow Chemical Company, Midland, Mich., a corporation of Delaware
No Drawing. Filed Mar. 20, 1964, Ser. No. 353,607
5 Claims. (Cl. 23—301)

This invention relates to a method for preparing crystals of magnesium sulfate trihydrate and, more particularly, is concerned with the preparation of magnesium sulfate trihydrate (MgSO$_4$·3H$_2$O) crystals from dilute aqueous magnesium sulfate solutions.

Until now, there have been no commercial processes available for preparing crystals of magnesium sulfate trihydrate. Those hydrated magnesium sulfate salts produced by present commercial processes include magnesium sulfate heptahydrate and magnesium sulfate hexahydrate. In order to facilitate and lower the cost of shipping of the heptahydrate and hexahydrate salts, these solid salts are dried by hot air rotary or shelf driers to form magnesium sulfate monohydrate or anhydrous magnesium sulfate. The drying procedure lowers the weight of H$_2$O that must be shipped per ton of MgSO$_4$. However, this drying step is expensive and time consuming.

It is a principal object of the instant invention to provide a method for preparing crystals of MgSO$_4$·3H$_2$O by direct precipitation of magnesium sulfate trihydrate from an aqueous solution of magnesium sulfate without the need for any expensive drying steps.

A further object is to provide a method for preparing magnesium sulfate trihydrate in the form of dry, free-flowing crystals from aqueous solutions of magnesium sulfate.

An additional object is to provide a method for preparing magnesium sulfate trihydrate which is both inexpensive and expedient and which can be used commercially.

Other objects and advantages of the instant invention will become apparent from reading the detailed description thereof set forth hereinafter.

In general, the new and novel method of the instant invention for preparing crystals of magnesium sulfate trihydrate comprises heating an aqueous dilute magnesium sulfate solution in a reactor vessel to a temperature within the range of from about 106° to about 111° C., ordinarily within the range of from about 106.5 to 109 and preferably within the range of from about 107° to about 108° C. Magnesium sulfate trihydrate precipitates from said solution. The so-precipitated magnesium sulfate trihydrate is then separated from the remainder of solution, and is dried thereby to recover crystals of MgSO$_4$·3H$_2$O directly.

Magnesium sulfate trihydrate recovery can be further increased by including the step of adding seed crystals of MgSO$_4$·3H$_2$O to the reactor vessel while maintaining the temperature therein within the aforementioned range. This step facilitates the formation of the trihydrate precipitate.

The aqueous solution of magnesium sulfate used as a source material herein should contain from about 5 to about 40 weight percent MgSO$_4$ and preferably from about 25 to about 30 weight percent MgSO$_4$.

As the MgSO$_4$-containing solution is heated in the aforementioned temperature range, the precipitate of magnesium sulfate trihydrate starts to form. The heating step should be continued until a desired quantity of the trihydrate salt precipitate from said solution.

If the MgSO$_4$-containing solution is heated to temperatures of less than 106° C. no MgSO$_4$·3H$_2$O crystals will form. Once the MgSO$_4$·3H$_2$O crystals are formed the temperature must be maintained above about 106.5° C. or said trihydrate crystals will be converted to MgSO$_4$·1H$_2$O. The monohydrate salt has a crystalline particle structure which is too fine to be handled economically. If the temperature of the MgSO$_4$ source solution is heated to temperatures above 111° C., the entire batch will solidify with MgSO$_4$·6H$_2$O crystals forming.

The precipitate of magnesium sulfate trihydrate can be separated from the filtrate, for example, by centrifuging the trihydrate-containing solution and removing the filtrate therefrom. Dry crystals of MgSO$_4$·3H$_2$O remain.

Free-flowing cyrstals of MgSO$_4$·3H$_2$O are obtained by drying said precipitate, for example, by cooling the wet trihydrate salt to a temperature below about 80° C. for a period of from about 5 to about 20 minutes, or by spinning the precipitate dry.

In a preferred variation of the instant method, a dilute aqueous solution of magnesium sulfate is heated in a reactor vessel to a temperature within the range of from about 106.5° to about 109° C., and preferably within the range of from about 107° to about 108° C. This temperature is maintained while adding crystals of MgSO$_4$·6H$_2$O to the solution. The hexahydrate crystals are added at such a rate that caking does not form in the reactor. A ratio of H$_2$O to MgSO$_4$ in the solution is maintained within the range of from about 1.4 to about 1.8, and preferably, at about 1.45. When a thick slurry forms comprising the magnesium sulfate trihydrate precipitate in the aqueous solution, the addition of hexahydrate crystals is discontinued. The trihydrate precipitate is then separated from the solution and is dried, thereby producing dry crystals of MgSO$_4$·3H$_2$O. This preferred method is a very efficient one in that fuel costs are lessened and readily available MgSO$_4$·6H$_2$O is converted into the more useful form of MgSO$_4$·3H$_2$O.

The aforedescribed preferred variation of the method of the instant invention can be modified by adding the crystals of MgSO$_4$·6H$_2$O to said aqueous solution until a slurry containing from about 22 to about 26 weight percent MgSO$_4$·3H$_2$O forms in said solution. The temperature of the entire solution plus precipitate is maintained within the range of from about 107° to about 108° C. while crystals of MgSO$_4$·7H$_2$O are added to the mixture thereby continuously forming a slurry containing from about 22 to about 26 weight percent MgSO$_4$·3H$_2$O. An advantage of this variation is that this method is a continuous one which utilizes two highly available forms of magnesium sulfate, the heptahydrate form and the hexahydrate form.

The aforementioned methods and variations can be further modified by adding the step of recycling the filtrate, which is separated from the trihydrate precipitate, back to the reactor vessel so that any MgSO$_4$ remaining in said filtrate is fully utilized in preparing the trihydrate salt.

The following examples are illustrative of the instant invention and are in no way meant to limit it thereto.

*Example 1*

About 800 grams of filtered MgSO$_4$ solution (specific gravity at 25° C. of about 1.276) were introduced into a one liter three-neck Kontes flask. A thermometer was placed through one of the necks, a stirrer through the middle neck and a condenser attached through the third neck. The batch was brought to a boiling point of about 110.3° C. and evaporation carried out for about 30 minutes at a rate producing about 10 milliliters of condensate every 10 minutes. The batch was then cooled to about 108° C. whereupon crystals formed. About 71.8 grams of crystals were recovered from the solution and spun dry in a centrifuge. Analysis of the crystals gave approximately 68.4 percent MgSO₄ and 31.6 percent H₂O. Analysis by X-ray showed the crystals to be substantially MgSO₄·3H₂O.

*Example 2*

About 1200 grams of filtered MgSO₄ solution (specific gravity at 25° C. of about 1.276) were put into a one liter three-neck Kontes flask, as in Example 1. The batch was brought to the boiling point and evaporation carried out at a rate of 25 milliliters of condensate every 10 minutes. When the atmospheric boiling point reached 107° C. (about 449 milliliters of condensate had been collected), about 10 grams of MgSO₄·3H₂O crystals were added as seed crystals. Evaporation was continued at the same rate until a total of about 573.5 milliliters of condensate had ben collected. At this point, the temperature was 108.0° C. and a thick aqueous crystal slurry had been formed. About 608 grams of this slurry (108.0° C.) were fed to a centrifuge having a cloth bag and the crystals spun dry. The crystals were not washed. About 156.1 grams of substantially dry crystals were obtained. Analysis of the crystals gave approximately 68.2 percent MgSO₄ and 31.8 percent H₂O. Analysis by X-ray showed the crystals to be substantially MgSO₄·3H₂O. The filtrate contaniing 41.0 percent MgSO₄ weighed 411.8 grams.

*Example 3*

About 1000 grams of MgSO₄ solution (specific gravity at 25° C. of 1.276) were put into a one liter, three-necked Kontes flask as in Example 1. The solution was evaporated at a rate of 25 milliliters of condensate every 10 minutes. When the atmospheric boiling point reached 106.5° C., the batch was seeded with about 10 grams of MgSO₄·3H₂O crystals. As soon as the seed crystals were added, a feed of MgSO₄·6H₂O was started. The MgSO₄·6H₂O crystals were fed to the batch intermittently at a rate of about 53 grams of MgSO₄·6H₂O (approximately 52 percent MgSO₄) every 5 minutes and the evaporation rate continued at 25 milliliters of condensate every 10 minutes. After the addition of the crystals, the boiling point goes to 107.5°–108.0° C. The MgSO₄·6H₂O crystal feed was continued until about 265 grams of crystals had been fed and evaporation contiued until a total of about 433 milliliters of condensate were collected. At this point, the batch was a thick slurry of crystals. The slurry weighing about 755 grams, was fed to a centrifuge which had a metal screen. The slurry was so thick is was necessary to recycle some of the filtrate in order to wash all of the crystals into the centrifuge. The crystals, with no washing, were spun dry. The spun dry crystals weighed 183.4 grams. The crystals contained (by drying) about 68.0 percent MgSO₄ and about 32.0 percent H₂O. The X-ray analysis showed substantially all MgSO₄·3H₂O. The filtrate containing 40.2 percent MgSO₄ weighed 504.4 grams.

*Example 4*

In a manner similar to that described in Example 3, about 1000 grams of MgSO₄ solution were evaporated to a boiling point of 107.5° C. At this time, about 204 grams of crystals of MgSO₄·6H₂O were fed to the solution at the rate of 20.1 grams every 5 minutes. The evaporation rate during the addition of MgSO₄·6H₂O was carried out at 10 milliliters of condensate every 10 minutes. About 430 milliliters of H₂O were evaporated off and a crystal slurry of about 730 grams was obtained. This crystal slurry was fed to a centrifuge. The unwashed spun dry crystal cake weighed about 187.0 grams. A sample of this cake dried at 350° C. was found to contain about 68.2 percent MgSO₄ and about 31.8 percent H₂O. An X-ray analysis of the crystals showed substantially all MgSO₄·3H₂O.

*Example 5*

The MgSO₄ solution for this example was made from 520 grams of filtrate from a previous batch plus 186 grams of approximately 25 percent MgSO₄ solution (specific gravity of 1.276 at 25° C.). These were placed in a one liter flask as usual, but this time, a reflux condenser was changed to a regular condenser. The temperature of the batch was brought up slowly to refluxing temperature which was 107.5° C. At this point, the reflux condenser was changed for a regular condenser. The batch was seeded with MgSO₄·3H₂O crystals, then MgSO₄·6H₂O crystals were added at a rate of 20.1 grams every 5 minutes and the evaporation carried out at a rate to give 10 milliliters of condensate every 10 minutes. In this manner, with the temperature varying from 107°–108° C., 204 grams of MgSO₄·6H₂O crystals were added to the batch and 60 milliliters of condensate were collected.

The 790 grams of slurry were fed at 107.5° C. to a centrifuge with a metal screen. About 168.5 grams of unwashed spun dry crystals were taken off. The analysis (by drying) gave 68.0 percent MgSO₄ and 32 percent H₂O. X-ray analysis showed the crystals as substantially all MgSO₄·3H₂O. The filtrate containing 42.0 percent MgSO₄ weighed 570.4 grams.

*Example 6*

About 1000 grams of MgSO₄ solution (specific gravity at 25° C. of 1.276) were evaporated to a boiling point of 107.5° C. at an evaporation rate of 25 milliliters of condensate every 10 minutes. At 107.5° C., the batch was seeded with MgSO₄·3H₂O crystals. Then $$MgSO_4 \cdot 6H_2O$$

crystals were fed at 20.1 grams every 5 minutes, with a new evaporation rate of about 8 milliliters condensate every 10 minutes, until 204 grams of MgSO₄·6H₂O were added.

In previous procedures, the slurry was centrifuged at this point. However, in this experiment, MgSO₄·7H₂O (Epsom salt) was added to the slurry at a rate of 22.0 grams MgSO₄·7H₂O every 5 minutes holding the temperature above 107° C. This was continued for 50 minutes with a total of 220 grams of MgSO₄·7H₂O being added. Only 17 milliliters of water were evaporated during the feeding of MgSO₄·7H₂O.

Approximately two-thirds (676 grams) of the crystal slurry was fed to a centrifuge. The unwashed spun dry crystal cake weighed 156.4 grams. Analysis of the crystals gave 68.2 percent MgSO₄ and 31.8 percent H₂O. X-ray analysis showed the crystals to be substantially all MgSO₄·3H₂O. The filtrate weighed 485.9 grams and contained 41.2 percent MgSO₄. This shows that the MgSO₄·7H₂O was converted to MgSO₄·3H₂O and a solution of approximately 41 percent MgSO₄.

Various modifications can be made in the method of the instant invention without departing from the spirit or scope thereof, for it is to be understood that I limit myself only as defined in the appended claims.

What is claimed is:

1. A method for preparing magnesium sulfate trihydrate crystals from magnesium sulfate solutions which comprises:
    (a) concentrating by heating an unsaturated aqueous solution of magnesium sulfate to a boiling temperature, at atmospheric pressure, within the range of from about 106° to about 111° C.,
    (b) maintaining the said temperature range while precipitating magnesium sulfate trihydrate crystals in the reaction mass, and
    (c) separating and recovering said crystals of magnesium sulfate trihydrate from the aqueous solution.

2. The method in accordance with claim 1 and including the steps of adding seed crystals of MgSO₄·3H₂O to said aqueous solution to provide a ratio of H₂O to MgSO₄ in said solution within the range of from about 1.4 to about 1.8 and maintaining the temperature of said solution within the range of from about 107° to about 108° C.

3. The method in accordance with claim 1 and including the step of adding crystals of $MgSO_4 \cdot 6H_2O$ to said aqueous solution while maintaining the temperature of said solution within the range of from about 107° to about 108° C. to provide a ratio of $H_2O$ to $MgSO_4$ in said solution within the range of from about 1.4 to about 1.8.

4. The method in accordance with claim 3 and including the steps of:
   (a) adding an amount of said crystals of $MgSO_4 \cdot 6H_2O$ to said aqueous solution while maintaining the temperature of said solution within the range of from about 107° to about 108° C. to provide a slurry containing from about 22 to about 26 weight percent $MgSO_4 \cdot 3H_2O$, and subsequently,
   (b) continuously adding crystals of $MgSO_4 \cdot 7H_2O$ to said slurry while maintaining said reaction temperature thereby to continuously produce said slurry containing from about 22 to about 26 weight percent $MgSO_4 \cdot 3H_2O$ crystals.

5. The method in accordance with claim 1 including the step of recycling the aqueous filtrate obtained from said $MgSO_4 \cdot 3H_2O$ crystal containing solution for reuse as an $MgSO_4$ source.

References Cited by the Examiner
FOREIGN PATENTS

| | | |
|---|---|---|
| 445,605 | 4/1936 | Great Britain. |
| 450,987 | 7/1936 | Great Britain. |

OTHER REFERENCES

Crystallization by Mullin; February 1961, pages 67–109.

NORMAN YUDKOFF, *Primary Examiner.*

G. P. HINES, *Assistant Examiner.*